Figure 1:
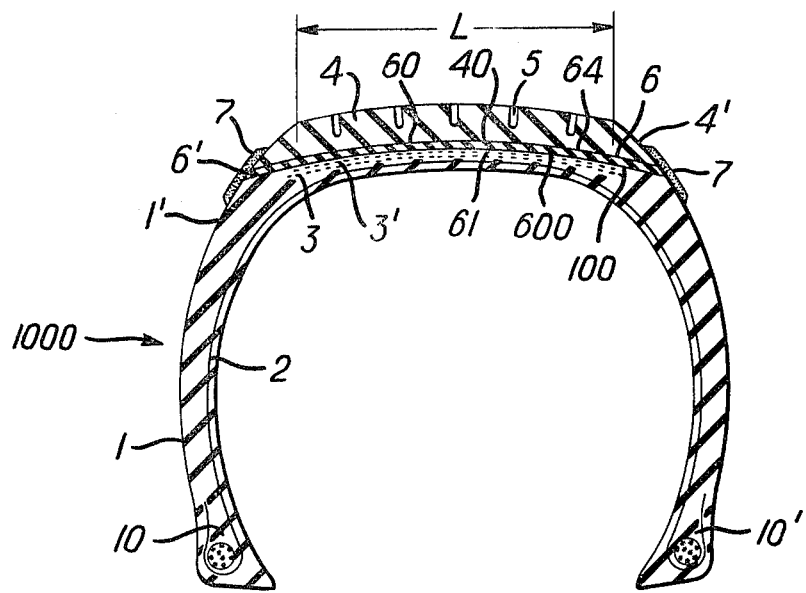

United States Patent [19]

Durif

[11] 4,424,088

[45] Jan. 3, 1984

[54] PROCESS FOR CAUSING AT LEAST TWO BODIES TO ADHERE TO EACH OTHER, IN PARTICULAR IN ORDER TO MANUFACTURE, REPAIR OR RETREAD A TIRE

[75] Inventor: Pierre Durif, Clermont-Ferrand, France

[73] Assignee: Compagnie Generale des Etablissements Michelin, Clermont-Ferrand, France

[21] Appl. No.: 327,937

[22] Filed: Dec. 7, 1981

[30] Foreign Application Priority Data

Dec. 16, 1980 [FR] France ............................... 80 26741

[51] Int. Cl.³ .......................... B60C 21/00; B29H 5/16
[52] U.S. Cl. ........................................ 156/87; 156/96; 156/97; 156/286; 425/812
[58] Field of Search ..................... 156/96, 97, 95, 285, 156/286, 104, 105, 382, 394.1; 264/102; 425/812; 106/84, 87

[56] References Cited

U.S. PATENT DOCUMENTS

| | | |
|---|---|---|
| 3,894,897 | 7/1975 | Batchelor . |
| 3,986,916 | 10/1976 | Maransoni ............................ 156/382 |
| 4,234,369 | 11/1980 | Schelkmann .......................... 156/95 |
| 4,234,533 | 11/1980 | Langlands ............................ 425/812 |
| 4,264,544 | 4/1981 | Wilheim .............................. 425/812 |

FOREIGN PATENT DOCUMENTS

| | | |
|---|---|---|
| 1094976 | 12/1960 | Fed. Rep. of Germany . |
| 2423062 | 12/1975 | Fed. Rep. of Germany . |
| 2030005 | 10/1970 | France . |
| 2130355 | 11/1972 | France . |
| 2152727 | 4/1973 | France . |
| 1277642 | 6/1972 | United Kingdom .................. 156/96 |

OTHER PUBLICATIONS

"Silicone Rubbers", C. M. Blow, Rubber Technology and Manufacture, 1971, Butterworths, London, pp. 130-137.

Primary Examiner—Michael W. Ball
Attorney, Agent, or Firm—Brumbaugh, Graves, Donohue & Raymond

[57] ABSTRACT

A process for causing at least two bodies, at least one of which is deformable, to adhere to each other, which comprises arranging a face of one of the bodies against a face of the other body, forming a lateral joint by applying a joint-forming material astride the two bodies over at least part of the outside of the resultant interface, and arranging the assembly thus obtained within an enclosure which is pressurized by a fluid, is characterized by the fact that the joint-forming material consists at least in part of a silicone elastomer.

21 Claims, 3 Drawing Figures

PROCESS FOR CAUSING AT LEAST TWO BODIES TO ADHERE TO EACH OTHER, IN PARTICULAR IN ORDER TO MANUFACTURE, REPAIR OR RETREAD A TIRE

The object of the present invention is to provide a process for causing a face of one body to adhere to a face of another body, at least one of the bodies being deformable, for instance, for the manufacture, repair or retreading of tires for vehicle wheels.

Very strong adherence is desired, for instance, when one wishes to fasten a tread or bars (tires for agricultural equipment or earth movers) onto the carcass of a tire or else when it is desired to cause a repair piece of rubber (for instance, a patch) to adhere to a damaged part of a tire.

In order to assure a bond which is as strong as possible between the two faces to be connected, it is customary to place the tire provided with its tread or bars or its repair patch within a heated enclosure containing a dry or wet fluid under pressure, within which the two parts of the assembly are held firmly applied against each other under the force of the pressure of the fluid, the heat acting to vulcanize the rubber parts which have not been already vulcanized.

Between the two rubber parts intended to be connected to each other there is generally interposed a layer of connecting rubber which therefore forms a body arranged between two extreme bodies consisting of the two parts of the tire.

This process as a whole makes it necessary that the air which is inevitably present between the two faces to be assembled be removed therefrom practically in its entirety in order that no air pocket, as small as it may be, will jeopardize the proper adherence of the assembly. Furthermore, it is absolutely necessary to prevent any infiltration of fluid under pressure between the two faces of the assembly.

The means employed in order, on the one head, to evacuate the air before the heating under pressure and, on the other hand, to prevent any infiltration of fluid during the course of this heating are more complicated, larger, more difficult to handle and more expensive the larger the size of the tire. When it is a question of retreading a tire, these means generally comprise an airtight flexible membrane of sheathing within which the tire is placed and which may possibly be connected to a source of vacuum. Such a membrane is described, for instance, in West German Pat. No. 1,094,976. The placing of the tire within this membrane is effected manually and requires at times considerable physical effort. Furthermore, rings must be used in order to assure tightness between the periphery of the membrane and the tire. These rings, which are generally of metal, frequently cause damage to the membrane, which must then be descarded after having been used only a dozen times. Finally, the assemblies produced with these known means are of variable quality, in particular with respect to the presence of larger or smaller air pockets between the assembled faces.

It has already been proposed (French Pat. No. 2,030,005) to place the tire within the heating enclosure under pressure without having previously introduced it into an airtight flexible membrane. One of the variants of the process described in that patent comprises the following four steps:

(1) the new tread is applied to the carcass with the interposition of a layer of a connecting rubber;

(2) the air enclosed between the carcass, the layer of connecting rubber and the tread is expelled by rolling;

(3) a heat-resistant material is applied, for instance, by spraying or brushing, onto the side faces of the tread and the carcass in order to avoid any lateral flow of the layer of connecting rubber which might cause relative displacement between the carcass and the tread;

(4) finally, the assembly is introduced into a heated enclosure which will be placed under pressure.

The patent in which this known process is described does not give any information, no matter how vague, concerning the heat-resistant material.

The present inventor then carried out tests in order to find a material which actually makes it possible to operate without any sort of membrane or sheath, this material being applied to the outside of the interface of the bodies and assuring with practically complete certainty a perfect bond, and particularly one without any inclusion of air between the bodies.

The tests carried out with various elastomers customarily employed in rubber work, particularly diene or polyurethane elastomers, did not make it possible to assure a perfect bond between the tread and the carcass unless all of the air had been expelled from between these two parts by a very careful rolling effected before the application of the elastomer. Now, while such a rolling is conceivable under ideal work conditions, the fact is that in practice, particularly in the case of tires of very large dimension, the worker entrusted with this job does not carry it out with all desirable care. The possibility of the inclusion of air must therefore be feared and a tire which contains such an inclusion may well become unusable after only a few hours of service.

Despite the failures obtained with the elastomers tested, the present inventor continued his search to find or create a material which fully satisfies the most severe requirements even when the manual or mechanical rolling operation may have left air pockets between the carcass, the connecting rubber and the tread.

In the course of the continuation of these tests, the present inventor was surprised to find that a family of elastomers which are incompatible with the base mixes of natural and/or synthetic rubbers customarily used in the manufacture, repair or retreading of tires made it possible to produce assemblies which give full satisfaction. This family is the family of the silicone elastomers.

The present invention therefore concerns a process for causing at least two bodies, at least one of which is deformable, to adhere to each other. The process which comprises arranging a face of one of the bodies against a face of the other body, forming a lateral joint by applying a joint-forming material astride the two bodies over at least part of the outside of the resultant interface, and arranging the assembly thus obtained within an enclosure which is pressurized by a fluid, is characterized by the fact that the joint-forming material consists at least in part of a silicone elastomer.

The use in accordance with the invention of a silicone elastomer surprisingly makes it possible either to do away with any operation for elimination of air between the assembled faces before the application of the silicone elastomer or to carry out this operation, for instance, by rolling, with less care and effort and more rapidly, resulting in a substantial saving in time and in particular in the certainty of always obtaining perfect adherence between the two faces after application of the pressure.

The present inventor's explanation of the phenomena observed is as follows:

At the start of the application of the pressure by the fluid onto the bodies, this silicone elastomer lateral joint, which is free of pores, permits the passage of air which may still be present between the faces of the bodies, which air can thus escape out of the assembly of the bodies through the lateral joint without it being possible for there to be any penetration of pressurization fluid between these faces, the draining of the air towards the lateral joint within the assembly of the bodies being made possible by the presence of imperfect contacts between the faces, the deformability of at least one of the bodies being necessary in order that these phenomena can take place.

By way of example, at least one of the bodies consists at least in part of one or more natural and/or synthetic rubbers, these rubbers being, for instance, either vulcanized or vulcanizable within the enclosure under pressure, which enclosure may possibly be heated.

For the carrying out of the invention, the joint-forming material may, if desired, be applied at least in part in liquid or paste form, the lateral joint becoming solid preferably before the assembly is in contact with the fluid under pressure, as the result of an at least partial vulcanization of the silicone elastomer. In this case, silicone elastomers vulcanizable at ambient temperature are preferably employed, since they can be used easily in ordinary shops and closely follow the shape of the parts which they cover without damaging them, which is important, for instance, when using tire sidewalls which have markings or designs.

Furthermore, such silicone elastomers generally vulcanize rapidly at ambient temperature so that the period of time between the application of the silicone elastomer and the introduction into the enclosure may be short, for instance, about an hour, which substantially reduces the cost.

Among the silicone elastomers which vulcanize at ambient temperature single or multiple component products can be used, and the catalytic reactions employed upon the vulcanization may be varied. The single-component silicone elastomers, at times referred to as monocomponents, are preferred, since their use is particularly simple. As suitable monocomponent silicone elastomers mention may be made, for instance, of the one marketed by Rhone-Poulenc under the brand name Rhodorsil CAF 7037 or the one which Dow Corning sells under the designation 3140 RTV.

The liquid or paste joint-forming material can be applied in various ways, for instance, by brush, gun, spatula, scraper, or dipping. The application can be effected in one or more layers, if desired, and the total thickness applied may vary within wide limits so that precise adjustments are not necessary. This total thickness may be, for instance, from 0.01 mm to 20 mm, but it is preferably from 0.05 mm to 0.2 mm.

In order to facilitate the use of the liquid or paste joint-forming material it may be advantageous to dilute the silicone elastomer with one or more solvents currently employed in the silicone industry, for instance, aliphatic or aromatic hydrocarbons.

The viscosity of the diluted silicone elastomer used for the application may vary, for instance, from 500 centipoises to 20,000 centipoises and preferably from 3,000 centipoises to 10,000 centipoises, the viscosity being measured at ambient temperature, that is to say at about 20° C.

In accordance with one preferred feature of the process of the invention, the joint-forming material used has a color different from that of the parts to be connected to each other so that upon the application of this elastomer one can easily visually note the places of the region of junction of these two surfaces which are not covered with elastomer or not sufficiently covered with it.

Since a silicone elastomer is used to produce the lateral joint, it is possible, if desired, for instance for reasons of appearance, easily to remove this lateral joint by simple peeling upon emergence from the enclosure. It can also be removed, together with any excess thickness of the bodies, by the use of mechanical means (grinding, brushing, cutting, sanding, etc.).

Removal by mechanical means is recommended when it is found that the lateral joint, for instance, in the form of a film, has infiltrated over a short distance, namely at most a few millimeters, between the two connected faces.

When such an infiltration must be absolutely avoided, another feature of the process of the invention consists in first applying an intermediate layer of connecting rubber, for instance of the same nature as that which may be placed between the two faces which are to be adhered to each other, over each of the two bodies to be assembled along the entire outer line of their interface and astride the latter over a width of, for instance, at least 20 mm to 25 mm on both sides of that line.

This intermediate layer is not applied too tightly to the bodies to be assembled in order not to interfere with the evacuation of the air.

A silicone elastomer lateral joint in the form, for instance, of a film is then applied onto said intermediate layer, extending around its contour.

The articles obtained in accordance with the invention are characterized by an extremely compact bond of the two faces and therefore by a total absence of air pockets between them. This is true whenever the pressure enclosure contains a moist atmosphere (steam). As the results obtained in a dry atmosphere are not uniformly as good, another important characteristic of the invention consists in moistening the lateral joint, for instance by means of a film of water or a water-impregnated porous matrix, in particular a water-impregnated foam, before introduction into the dry enclosure or within said enclosure itself before or during the pressurization.

Tires for earth-moving equipment which are made in accordance with the invention have been able to travel under very severe conditions for 198 hours each without separation, while certain tires produced without use of a silicone elastomer showed separation after only 8 hours of travel under the same very severe conditions.

Figure 2:
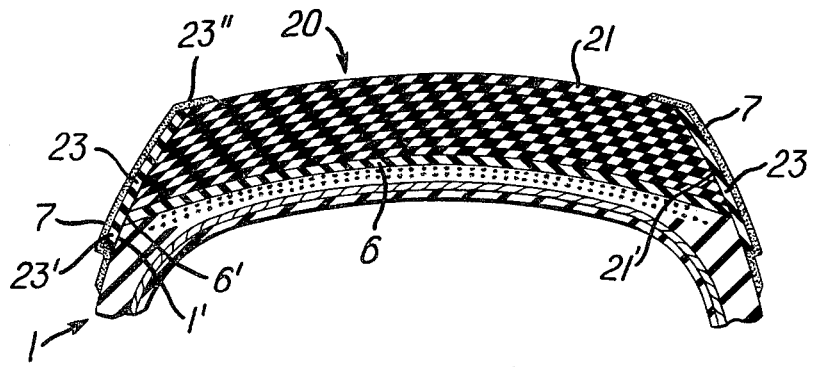
Figure 3:
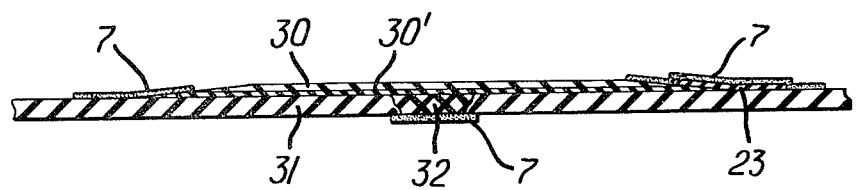

Examples of the use of silicone elastomer in accordance with the invention are described below with reference to the drawing in which FIGS. 1 and 2 are each a cross section through a tire while FIG. 3 is a sectional view through a patch applied to a repaired article, all of these figures being schematic.

FIG. 1 shows a tire 1000 comprising a carcass 1 and a tread 4. The carcass 1 consists of vulcanized rubber reinforced by cables 2 which are continuous from one bead 10 to the other bead 10' of the tire and by cables 3,3' which extend over a distance substantially equal to the width L of the tread 4 of the tire. Between the tread 4, which consists of vulcanized rubber and has grooves 5, and the upper layer of cables 3', that is to say between the carcass 1 and the tread 4, there is interposed a layer of vulcanizable connecting rubber 6. In this way, the face 600 of the rubber 6 is arranged against the face 100 of the carcass 1, which produces the interface 61, while the face 60 of the rubber 6 is arranged against the face 40 of the tread 4, which produces the interface 64. The carcass 1, the tread 4 and the connecting rubber 6 contain, for instance, natural or synthetic diene rubbers.

Against the side faces 1', 6' and 4' of the carcass 1, the connecting layer 6 and the tread 4, respectively, a thin layer (thickness exaggerated in the drawing) of a silicone elastomer which is vulcanizable at ambient temperature has been applied by brush all around the tire, the layer having then, about one hour after its application, been vulcanized so that it has become a very coherent relatively elastic film 7. In this example, this silicone elastomer was the one marketed under the brand name Rhodorsil CAF 7037 by Rhone-Poulenc. The film 7 which connects the bodies 1, 4, 6 is therefore on the outside of the interfaces 61, 64.

The tire 1000 was then placed, as is, in an enclosure and left there, during about 180 minutes, in contact with a fluid under pressure (about 5.5 bars) containing air and steam, the tire being heated by said fluid to about 125° C. When the tire was removed from the enclosure, the elastomer film 7 appeared to be in the same condition as before the introduction of the tire into the enclosure, due in particular to the good resistance to heat and pressure of the vulcanized silicone.

A careful examination of the tire 1000 upon its emergence from the enclosure did not reveal the presence of any air pocket at the interfaces on the two sides of the layer of connecting rubber 6.

The example illustrated in FIG. 2 differs from the preceding one by the fact that the tread 20 (shown on a larger scale than in FIG. 1) is formed of several turns of a vulcanizable rubber sheet 21 around the tire carcass 1 and by the fact that an intermediate layer of connecting rubber 23, for instance of the same nature as the possible layer of connecting rubber 6, has been applied directly against the side faces 1', 6' and 21' of the carcass 1, the connecting rubber 6 and the turns of vulcanizable rubber sheet 21, respectively. The thin layer 7 of silicone elastomer vulcanizable at ambient temperature covers the entire outer surface of the intermediate connecting layer 23 and extends slightly beyond the edges 23', 23" of that layer 23.

Separation tests on the tread 20 did not show any defect in bonding of the turns of the sheet 21 with each other or of the sheet 21 with the carcass 1 of the tire.

The embodiment of the invention shown in FIG. 3 concerns the application, to one face of the wall 31 of a rubber article in which an injury 32 has been repaired in known manner, of a fluid-tight repair patch 30 having a connecting layer 30', if it is already vulcanized. This repair patch 30 was suitably applied to that face before vulcanization of the repair in a heated enclosure under pressure. Before said vulcanization a layer 7 of silicone elastomer vulcanizable at ambient temperature was brushed, on the one hand, onto the beveled edges of the patch 30 and the adjacent portions of that face and, on the other hand, directly against the repaired injury 32. This layer 7 was placed either directly on the patch 30 and on the wall 31 (as shown to the left in FIG. 3) or on an intermediate layer of connecting rubber 23 (as shown to the right in FIG. 3) previously applied against the edge of the patch 30 and against the wall 31. After heating under pressure, it is found that the patch 30 adheres perfectly to the wall 31, even if air is still imprisoned between these two parts before the pressurization.

In the above examples, it is possible to use a lateral joint of a silicone elastomer which has been vulcanized prior to its application to the bodies. This lateral joint of vulcanized silicone elastomer may then be placed in contact with the bodies by means of a fastening seam, for instance, a silicone elastomer vulcanizable at ordinary temperature applied in liquid or paste form all around the joint and integral with the joint. This variant of the process of the invention thus makes it possible to reuse the silicone elastomer joint, which decreases the cost.

The invention also includes cases in which the silicone elastomer material forming the lateral joint is applied to only a part of the outside of the interface of interfaces, the rest of the outside of the interface or interfaces being covered with a silicone-free lateral joint which is impervious to air and to the pressurization fluid of the enclosure. In this case, it is preferable to use means which permit draining the air enclosed between the bodies towards the silicone elastomer lateral joint, these means consisting, for instance, of threads, fibers, cables, woven or nonwoven materials. This variant of the process of the invention may make it possible to limit the amount of silicone elastomer used and therefore to limit the cost.

Of course, the invention is not limited to the embodiments which have been described above. Thus for the bodies it is possible to use deformable materials other than rubbers, for instance, other organic polymers, particularly thermoplastics, and the articles obtained by the method of the invention may be articles other than tires.

What is claimed is:

1. A process for causing at least two bodies, at least one of which is deformable, to adhere to each other, characterized by the following steps:
    (a) arranging a face of one of the bodies against a face of the other body in such a manner that there are imperfect contacts between the faces;
    (b) applying a joint-forming silicone elastomer in liquid or paste form astride the two bodies over at least part of the outside of the resultant interface to form a lateral joint, each of the bodies consisting at least in part of a rubber which is incompatible with said silicone elastomer;
    (c) at least partially vulcanizing the silicone elastomer, the lateral joint becoming an air-permeable solid as the result of said at least partial vulcanization;
    (d) arranging the assembly thus obtained within an enclosure which is heated and pressurized by a fluid, the assembly being in contact with the fluid, so that, due to the imperfect contacts between the faces, air which may still be present between the faces of the bodies can escape out of the assembly through the lateral joint, towards the fluid; and
    (e) vulcanizing in the enclosure at least one rubber of at least one of the bodies for bonding the bodies.

2. A process according to claim 1, characterized by the fact that the silicone elastomer is vulcanizable at ambient temperature.

3. A process according to claim 2, characterized by the fact that the silicone elastomer is a monocomponent.

4. A process according to claim 1, characterized by the fact that the silicone elastomer is diluted with at least one solvent before application.

5. A process according to claim 4, characterized by the fact that the viscosity of the diluted silicone elastomer is from 500 centipoises to 20,000 centipoises, this viscosity being measured at ambient temperature.

6. A process according to claim 5, characterized by the fact that the viscosity of the diluted silicone elastomer is from 3,000 centipoises to 10,000 centipoises.

7. A process according to claim 1, characterized by the fact that, after application, the joint-forming silicone elastomer forms at least one layer, the total thickness applied being from 0.01 mm to 20 mm.

8. A process according to claim 7, characterized by the fact that the total thickness is from 0.05 mm to 0.2 mm.

9. A process according to claim 1, characterized by the fact that it comprises causing at least three bodies to adhere to each other, one of the bodies serving as a bond between two bodies which it separates, the joint-forming silicone elastomer being applied astride the three bodies over at least part of the outside of the interfaces.

10. A process according to claim 1, characterized by the fact that at least one of the bodies consists at least in part of a diene rubber.

11. A process according to claim 1, characterized by the fact that the enclosure is pressurized by a wet fluid.

12. A process according to claim 11, characterized by the fact that the wet fluid consists at least in part of steam.

13. A process according to claim 1, characterized by the fact that the enclosure is pressurized by a dry fluid and by the fact that the lateral joint is made moist before the assembly is in contact with the dry fluid, or upon such contact.

14. A process according to claim 1, characterized by the fact that the lateral joint is made moist by means of a film of water or a porous maxtrix impregnated with water.

15. A process according to claim 1, characterized by the fact that a partial evacuation of air initially contained between the faces of the bodies is effected before the joint-forming silicone elastomer is applied.

16. A process according to claim 1, characterized by the fact that the joint-forming silicone elastomer applied is in direct contact with the outside of the interface.

17. A process according to claim 1, characterized by the fact that the joint-forming silicone elastomer applied is in contact with an intermediate material which is itself in direct contact with the outside of the interface.

18. A process according to claim 1, characterized by the fact that the joint-forming silicone elastomer silicone elastomer is applied to only a part of the outside of the interface, the rest of the outside of the interface being covered with a silicone-free lateral joint which is impervious to air and to the pressurization fluid, and by the fact that means are used which permit draining air enclosed between the bodies towards the silicone elastomer lateral joint.

19. A process according to claim 1 or 11, characterized by the fact that one of the bodies consists of a tire carcass and another body consists of a tread.

20. A process according to claim 1, characterized by the fact that one of the bodies is a repair patch.

21. A process according to claim 1, characterized by the fact that the joint-forming silicone elastomer has a color different from the color of the bodies.

* * * * *

UNITED STATES PATENT AND TRADEMARK OFFICE
CERTIFICATE OF CORRECTION

PATENT NO. : 4,424,088

DATED : January 3, 1984

INVENTOR(S) : Pierre Durif

It is certified that error appears in the above—identified patent and that said Letters Patent is hereby corrected as shown below:

Col. 1, line 41, "head" should read -- hand --; line 58, "descarded" should read -- discarded --. Col. 6, line 20, "interface of" should read -- interface or --. Col. 8, line 3, "claim 1" should read -- claim 13 --; lines 19 and 20, "silicone elastomer silicone elastomer" should read -- silicone elastomer --; line 27, "claim 1 or 11" should read -- claim 1 or 9 --.

Signed and Sealed this

Tenth Day of April 1984

[SEAL]

Attest:

GERALD J. MOSSINGHOFF

Attesting Officer  Commissioner of Patents and Trademarks